US012790702B2

(12) United States Patent
Falk et al.

(10) Patent No.: US 12,790,702 B2
(45) Date of Patent: *Nov. 10, 2026

(54) ELECTROLYSIS DEVICE HAVING A CONVERTER AND METHOD FOR PROVIDING INSTANTANEOUS RESERVE POWER FOR AN AC VOLTAGE GRID

(71) Applicant: SMA Solar Technology AG, Niestetal (DE)

(72) Inventors: Andreas Falk, Kassel (DE); Christian Hardt, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/073,335

(22) Filed: Mar. 7, 2025

(65) Prior Publication Data

US 2025/0207279 A1 Jun. 26, 2025

Related U.S. Application Data

(63) Continuation of application No. 18/543,235, filed on Dec. 18, 2023, now Pat. No. 12,264,401, which is a continuation of application No. 17/355,565, filed on Jun. 23, 2021, now Pat. No. 11,851,776, which is a continuation of application No. PCT/EP2019/083382, filed on Dec. 3, 2019.

(30) Foreign Application Priority Data

Dec. 27, 2018 (DE) .................... 10 2018 133 641.1

(51) Int. Cl.
*C25B 15/02* (2021.01)
*C25B 9/65* (2021.01)
*H02M 3/04* (2006.01)

(52) U.S. Cl.
CPC ................ *C25B 15/02* (2013.01); *C25B 9/65* (2021.01); *H02M 3/04* (2013.01)

(58) Field of Classification Search
CPC ............. C25B 15/02; C25B 9/65; H02M 3/04
See application file for complete search history.

(56) References Cited

U.S. PATENT DOCUMENTS 11,851,776 B2 * 12/2023 Falk ........................ C25B 15/02
12,269,401 B2 * 4/2025 Zheng ................. B60R 16/0232

* cited by examiner

*Primary Examiner* — Robert L Deberadinis
(74) *Attorney, Agent, or Firm* — Eschweiler & Potashnik, LLC

(57) ABSTRACT

A method for operating an electrolysis device, having a converter which is connected on an AC voltage side to an AC voltage grid via a decoupling inductance and draws an AC active power from the AC voltage grid, and an electrolyzer, which is connected to the converter on the DC voltage side, is provided. The method includes operating the electrolysis device, when a grid frequency corresponds to a nominal frequency of the ACT voltage grid and is substantially constant over a time period, with an electrical power which is between 50% and 100% of a nominal power of the electrolyzer, and operating the converter in a voltage-impressing manner, such that an AC active power drawn from the AC voltage grid is changed on the basis of a change and/or a rate of change of the grid frequency in the AC voltage grid.

19 Claims, 9 Drawing Sheets

ELECTROLYSIS DEVICE HAVING A CONVERTER AND METHOD FOR PROVIDING INSTANTANEOUS RESERVE POWER FOR AN AC VOLTAGE GRID

CROSS REFERENCE TO RELATED APPLICATIONS

This application is a continuation of U.S. patent application Ser. No. 18/543,235, filed on Dec. 18, 2023 which is a continuation of Ser. No. 17/355,565, filed on Jun. 23, 2021, which is a continuation of International Patent Application number PCT/EP2019/083382, filed on Dec. 3, 2019, which claims priority to German Patent Application number 10 2018 133 641.1, filed on Dec. 27, 2018, and is hereby incorporated by reference in its entirety.

FIELD

The disclosure relates to an electrolysis device having a converter, to a method for operating an electrolysis device having a converter, and to a method for providing instantaneous reserve power for an AC voltage grid.

BACKGROUND

In an AC voltage grid which is constructed as a national integrated grid, deviations of the grid frequency from a nominal frequency of the AC voltage grid may arise on account of an imbalance between electrical power which is fed in and drawn electrical power. This imbalance and therefore the frequency deviation can be counteracted by virtue of devices, which can feed electrical power into the AC voltage grid and/or can draw electrical power from the AC voltage grid, varying the power fed in or drawn by them. In particular, at frequencies above the nominal frequency, the power which is fed in can be reduced or the power which is drawn can be increased, whereas, at frequencies below the nominal frequency, the power which is fed in is increased or the power which is drawn is reduced.

The respective change in the power in direct or indirect response to a frequency deviation is referred to as balancing power. In some AC voltage grids, in particular in the European integrated grid, the provision of this balancing power is organized in stages which build on one another in terms of time. The first control stage, the so-called instantaneous control, is ensured by means of devices which change their power in direct and immediate response to a frequency change. In the second control stage, the so-called primary control, which comes into effect in the event of a sustained frequency deviation, use is made of devices which specifically adjust their power on the basis of a characteristic curve as a function of the deviation of the grid frequency from the nominal frequency. In the third stage, the so-called secondary control, a likely persistent or foreseeable power imbalance in the AC voltage grid is counteracted in a planned manner by virtue of devices being instructed by a superordinate control device to suitably change their electrical power.

The prior art discloses devices which exchange electrical power between the AC voltage grid and a DC unit operating with direct current. The DC unit may comprise an energy generator, for example a photovoltaic generator, the power of which is converted in an inverter and is fed into the AC voltage grid. DE102005046919A1 discloses a method for buffering electrical wind energy generated from wind power by means of an electrolysis device, such that the wind power plant can provide balancing power. EP2705175A1 discloses an energy management system comprising an electrolysis system which can be used to provide balancing power.

The converters of such devices generally operate in this case in a current-impressing manner by virtue of a setpoint for the DC power being converted into a corresponding setpoint for the AC current and this AC current being fed into the AC voltage grid. The DC unit may also comprise a DC load, for example a non-reactive resistor, a machine or an electrochemical installation, operated by means of a current-impressing converter which draws AC power from the AC voltage grid and makes it available to the DC load as DC power. A setpoint for the DC power is likewise predefined for this current-impressing converter and is transformed, in a controller, into a setpoint for an AC current to be drawn from the AC voltage grid, such that the AC power is a function of the DC power.

Such converters may be, in particular, in the form of thyristor rectifiers or self-commutated IGBT converters which are synchronized with the AC voltage grid on the basis of a frequency measurement. In the event of a frequency change, this frequency measurement must first of all adjust to the new frequency before the setpoint for the DC power and consequently the AC power are adapted to the new situation. In this respect, a current-impressing converter cannot immediately respond to a frequency change in the AC voltage grid. On account of this delayed response, DC loads which are connected to the AC voltage grid via a converter operated in such a conventionally current-impressing manner are not suitable for providing instantaneous balancing power or instantaneous reserve.

DE102016115182A1 discloses a method for providing instantaneous reserve in an AC voltage grid, in which the power of a current-impressing converter is adjusted to an instantaneous reserve setpoint by means of a current controller. The setpoint is generated from a phase error signal from a PLL control loop which uses the AC voltages of the AC voltage grid as input variables. A current-impressing converter proves to be advantageous here over a voltage-impressing converter, in particular in the case of photovoltaic generators as energy sources.

EP2182626A1 discloses a method for operating a power converter, in which semiconductor switches are controlled selectively or in combination by means of voltage-impressing and/or current-impressing modulation. As a result, the intention is to advantageously combine the properties of the different types of modulation, which produce a voltage-impressing or current-impressing behavior of the power converter, which are described in detail in EP2182626A1.

Devices which are used during the first of the control stages mentioned at the outset for instantaneous control comprise, in particular, so-called synchronous generators which feed power into the grid or synchronous machines which draw power from the grid. Such synchronous generators and synchronous machines generally comprise rotating masses which have an inherent inertia. Synchronous machines and synchronous generators contribute to stabilizing the grid frequency by way of their electrical behavior, which is well known to a person skilled in the art, by virtue of their electrical power depending on the phase difference between the AC voltage of the AC voltage grid and the rotational frequency of the rotating mass on account of the inherent inertia. In other words, by virtue of its inertial flywheel mass, a synchronous generator or a synchronous machine can immediately respond to frequency changes and can also immediately counteract them.

In this case, it is assumed, according to the prior art, that the behavior of a synchronous generator can be emulated only with a device on the DC voltage side which is directly connected to the grid via a voltage-impressing converter. Such a converter, in which the switching commands for power semiconductor switches are derived from an AC setpoint for the input-side AC voltage of the converter, responds to a grid frequency change immediately, that is to say without control delays. Therefore, the device on the DC voltage side must also be able to immediately consume or emit energy and, for this purpose, must be directly connected to a DC link of the converter. Such a device on the DC voltage side comprises, for example, a battery which is connected to the grid via a voltage-setting converter and can immediately consume or emit energy. In this case, the voltage-impressing control would be greatly hindered by a control delay of any DC/DC converter for adapting the DC voltage or would even become impossible. This also applies, in particular, to a single-stage converter which has connected to it a photovoltaic generator which is operated with a PV voltage close to the grid rectification voltage, with the result that even small DC voltage dips can result in considerable distortions of the alternating current fed in by the converter; such dips must be prevented by means of suitable control of the DC source.

DE102010030093A1 discloses a device and a method for controlling the exchange of electrical energy between an AC voltage grid and an installation connected to the AC voltage grid, wherein the installation can include a consumer, a generator and/or an energy store. The device comprises a converter, in which the power exchanged with the AC voltage grid can be adjusted on the basis of active power/frequency statics. The converter additionally has a so-called synchronous machine emulator, by means of which the converter models the dynamic behavior of a synchronous machine. As a result, grid frequency support, in particular, is intended to be carried out in the transient and/or sub-transient time range, wherein the response of the device to a grid frequency change can be carried out in a differential manner, that is to say the change in the power is greater, the higher the temporal rate of change of the grid frequency. In this case, non-reactive resistors or machines are used as consumers, possibly in combination with a storage device for thermal, mechanical or chemical energy. As a result, some of the capacity of the consumers or some of the energy which is or can be stored in an energy store is available for grid support.

Further embodiments of synchronous machine emulation are known, for example, from DE102006047792A1, in which a so-called virtual synchronous machine (VISMA) is used for grid support, wherein the behavior of a synchronous machine is approximated by continuously solving differential equations, and from EP3376627A1 which describes a voltage-impressing converter (Voltage Source Inverter, VSI), the control system of which comprises a structure for generating a virtual inertia, with the result that the converter emulates the behavior of a synchronous generator.

EP1286444B1 discloses so-called droop mode control for an inverter, wherein the inverter is operated on the basis of frequency statics f (P) and voltage statics U (Q), with the result that the inverter immediately responds to frequency changes in the AC voltage grid with a change in the active power and, in this respect, is suitable for parallel operation with further inverters and, in particular, for setting up an island grid.

U.S. Pat. No. 7,645,931 discloses a device having a converter connected to an AC voltage grid, a photovoltaic generator and an electrolyzer, wherein the electrolyzer is permanently operated at an optimum operating point with a corresponding power, wherein the electrical power for operating the electrolyzer is guided to the electrolyzer either from the PV generator via a DC/DC converter or from the AC voltage grid via the converter.

EP2894722B1 discloses an arrangement for supplying an electrolyzer with direct current, in which semiconductor components of a rectifier, in particular its thyristors, are divided into two groups, wherein one of the groups is each directly arranged at one of the two DC connections of the electrolyzer. The rectifier may be connected to a medium-voltage grid via at least one transformer, and the output power of the rectifier can be set in a range between 20% and 50% of the maximum output power of the rectifier by controlling the thyristors.

SUMMARY

The disclosure is directed to a method for operating an electrolysis device connected to an AC voltage grid and an electrolysis device, with which an electrolyzer can be operated and instantaneous reserve power for stabilizing the grid frequency of the AC voltage grid can be provided at the same time.

In a method for operating an electrolysis device having a converter, which is connected, on the AC voltage side, to an AC voltage grid via a decoupling inductance and draws an AC active power from the AC voltage grid, and an electrolyzer, which is connected to the converter on the DC voltage side and, in the case of a grid frequency which corresponds to a nominal frequency of the AC voltage grid and is constant over time, is operated with an electrical power which is between 50% and 100% of a nominal power of the electrolyzer, wherein the converter is operated in a voltage-impressing manner, such that the AC active power drawn from the AC voltage grid is immediately changed on the basis of a change and/or a rate of change of the grid frequency in the AC voltage grid.

In comparison with conventional methods for operating an electrolysis device, the method according to the disclosure is distinguished, in particular, by the fact that the converter is operated in a voltage-impressing manner. This means, for example, that a setpoint for the input-side AC voltage of the converter is predefined when controlling the converter and the converter behaves such that this desired voltage is achieved if possible, in particular irrespective of the current which is then flowing. In addition, voltage-impressing operation of the converter involves the AC current drawn from the AC voltage grid depending on the grid frequency in such a manner that a change in the grid frequency results in an immediate change in the power drawn from the AC voltage grid, in particular irrespective of which sink is connected to that end of the converter which is opposite the AC voltage grid. In this case, the change in the power may be proportional to a rate of change of the grid frequency, in particular.

Precisely this immediate change in the power on the basis of a change in the grid frequency also belongs to the inherent behavior of a synchronous machine. In contrast to this, current-impressing operation has an inherent delay by virtue of a setpoint for the AC current being predefined, wherein this setpoint can be adapted at best indirectly in the case of frequency changes in order to stabilize the frequency, for example using a P (f) characteristic curve.

The immediate responses to changes in the grid frequency, associated with voltage-impressing operation, in the form of changes in the AC active power drawn from the AC voltage grid can be immediately passed on to an electrolyzer even though the electrolyzer itself is not able to make an accordingly fast change in the converted power. Nevertheless, a change in the AC active power can be immediately passed on to the electrolyzer via the converter, for example by means of a corresponding change in the DC voltage applied by the converter to the electrolyzer. The change in the DC voltage results, via a voltage/current characteristic curve of the electrolyzer, in a change in the power consumed by the electrolyzer. In this case, the electrolyzer is operated according to the disclosure before the change, that is to say in the case of a constant grid frequency, at between 50% and 100% of its nominal power, wherein the nominal power of the electrolyzer is below a maximum power of the electrolyzer and can correspond, in particular, to the power at the maximum efficiency of the electrolyzer.

The DC power of the electrolyzer can therefore be reduced or increased, which results in a change in the substance conversion in the electrolyzer. In this case, on account of its structure, an electrolyzer can permanently process the additional or reduced conversion occurring briefly as a result of a change in the DC power only when further measures for operating the electrolyzer take place, for example a change in the output of pumps for circulating electrolyte or for removing gases which are produced. However, these further measures have a comparatively high inertia, with the result that it is possible to stabilize the operation of the electrolyzer after a sudden change in the applied voltage only with a delay.

On the other hand, the voltage-impressing operation of the converter is distinguished by the fact that the change in the active power drawn from the AC voltage grid depends substantially on the change and/or the rate of change of the grid frequency, with the result that the active power returns to an initial value as soon as there is no longer a change in the grid frequency, that is to say, in particular, if the rate of change is equal to zero. As a result, the substance conversion in the electrolyzer also returns to the corresponding initial value as soon as the grid frequency has stabilized again.

If the grid frequency stabilized in this manner deviates from the nominal frequency of the AC voltage grid, primary balancing power is automatically provided and the instantaneous reserve power is no longer required. The electrolysis device therefore provides instantaneous reserve power only for a comparatively short period, with the result that the inertia of the substance conversions in the electrolyzer, which makes it necessary to start up pumps and fans, still does not play a role. The additional or reduced conversion, which takes place during the change in the grid frequency, can therefore be buffered in the electrolyzer, for example by tolerating a brief positive pressure or negative pressure in the electrolyzer and removing it again by means of subsequent measures during operation of the electrolyzer after the grid frequency has stabilized.

The disclosure is therefore based on the knowledge that a DC load connected to a voltage-setting converter need not necessarily be able to convert a change in the AC power drawn from the AC voltage grid just as quickly into a change in the DC power used for the intended purpose. Rather, it suffices if the DC load can at least briefly process and possibly internally buffer the changed DC power. In this case, an electrolyzer, in particular, proves to be a particularly advantageous DC load since, on the one hand, an electrolyzer can be immediately prompted to change the DC power, for example by virtue of the converter changing the DC voltage at the electrolyzer, and, on the other hand, said buffering inherently takes place in an electrolyzer, with the result that the likewise inherent inertia of the electrolyzer does not prevent an at least brief change in the DC power.

The voltage-impressing behavior of the electrolysis device can therefore be achieved according to the disclosure even though neither a resistive consumer nor an energy source or an energy store is connected to the converter.

During voltage-impressing operation of the converter, the converter can provide an instantaneous reserve power. For this purpose, it is possible to use a control structure which emulates the behavior of a synchronous machine with respect to frequency changes. This behavior stabilizes the grid frequency in a comparable manner to conventional power plants. Alternatively, it is possible to use droop mode control which was mentioned at the outset and comprises a frequency/power characteristic curve. Such control is likewise able to stabilize the grid frequency and may additionally comprise a voltage/reactive power characteristic curve which can be used to also stabilize the grid voltage in addition to the grid frequency and possibly to set up or stabilize an island grid in which further energy generation units can also be incorporated.

The change in the AC active power drawn from the AC voltage grid results in a change in the DC voltage at the electrolyzer, wherein the change in the DC voltage at the electrolyzer results in a change in a DC power consumed by the electrolyzer, which change corresponds to the change in the AC active power. As a result, the change in the AC active power drawn from the AC voltage grid can be immediately passed on to the electrolyzer as a change in the DC power consumed by the electrolyzer.

In one embodiment of the method, a voltage transformation can be produced between the electrolyzer and the converter by means of a first DC/DC converter. As a result, the adjustment range of the DC voltage at the electrolyzer can be extended in comparison with the voltage range which can be adjusted by the converter on the DC voltage side, such that the power consumption of the electrolyzer can also be adjusted over a wider range.

In addition, the converter can exchange electrical power with a PV generator connected on the DC voltage side, wherein the PV generator is connected to a DC link circuit in parallel with the electrolyzer. In this case, an electrical power generated by the PV generator is fed either into the electrolyzer or into the AC voltage grid. As a result, the electrolyzer can be supplied in a cost-effective manner with regeneratively generated electrical power which would otherwise have to be obtained from the AC voltage grid.

In a further embodiment of the method, the converter can exchange electrical power with a battery connected on the DC voltage side, wherein the battery is connected to the DC link circuit in parallel with the electrolyzer via a second DC/DC converter. The battery makes it possible to buffer electrical power and can decouple the power obtained from the grid from the electrolyzer power in terms of time.

In the embodiments of the method in which a DC/DC converter is arranged between the converter and a unit on the DC voltage side, the DC/DC converter can be used to stabilize the voltage of the DC link circuit. Specifically, controlling of the DC/DC converter may comprise feedforward control, wherein the feedforward control is used to set a DC current setpoint of the DC/DC converter on the basis of a phase difference between the grid voltage and the AC voltage at the input of the converter. The phase difference may be processed further by a d-q coordinate system and is proportional to the power drawn from the grid. As a result, the DC/DC converter is prompted to already change its power in the event of a change in the phase difference and not only in response to a change in the voltage in the DC link circuit The feedforward control is used to immediately modify the DC current setpoint of the DC/DC converter on the basis of a change in the grid frequency. As a result, a change in the voltage at the DC link circuit, which occurs on account of a change in the AC active power in response to the change in the grid frequency, is anticipated as it were. The controlling of the DC/DC converter is therefore such that the DC/DC converter immediately stabilizes the DC link circuit in the event of changes in the grid frequency. In the case of fast changes in the grid frequency, that is to say in the case of high rates of change of the grid frequency, which cause accordingly large phase differences and therefore particularly large changes in the AC power, the DC/DC converter must quickly additionally deliver or remove energy in order to prevent the DC link voltage from dropping or increasing excessively. For this purpose, the DC current setpoint for the DC/DC converter is subjected to feedforward control by means of the phase phi between the grid voltage and the power converter voltage and the control dynamic response is therefore increased.

The voltage at the DC link circuit can be stabilized by the first DC/DC converter and the electrolyzer connected to the latter and/or possibly by the second DC/DC converter and the battery connected to the latter. In this case, the phase difference may act on the clocking of the DC/DC converters directly or via a corresponding filter.

An electrolysis device according to the disclosure having an electrolyzer which is connected to a converter and draws electrical AC active power from an AC voltage grid via the converter is characterized in that the converter is configured to be operated in a voltage-impressing manner, such that a change in the grid frequency in the AC voltage grid causes an immediate change in the AC active power drawn from the AC voltage grid. This disclosure is based on the knowledge that the immediate responses of the converter to changes in the grid frequency, associated with voltage-impressing operation, in the form of changes in the AC active power drawn from the AC voltage grid can be immediately passed on to an electrolyzer. Although the electrolyzer itself is not able to permanently make a correspondingly fast change in the converted power, it can be immediately prompted, on the one hand, to change the DC power, for example by virtue of the converter changing the DC voltage at the electrolyzer, and, on the other hand, can buffer a brief deviation between a power impressed from the outside and a DC power setpoint which is static per se.

In one embodiment, the electrolysis device may comprise a first DC/DC converter which is arranged between the electrolyzer and the converter. As a result, the adjustment range of the voltage at the electrolyzer can be extended in comparison with the voltage range which can be adjusted by the converter on the DC voltage side, such that the power consumption of the electrolyzer can also be adjusted over a wider range.

In a further embodiment, the electrolysis device may comprise a photovoltaic generator which is connected to a DC link circuit of the electrolysis device in parallel with the electrolyzer on the DC voltage side. The photovoltaic generator can be used to favorably supply the electrolyzer with regeneratively generated electrical power which would otherwise have to be obtained from the AC voltage grid.

In a further embodiment, the electrolysis device may comprise a battery which is connected to the DC link circuit of the electrolysis device in parallel with the electrolyzer via a second DC/DC converter on the DC voltage side. The battery makes it possible to buffer electrical power and can decouple the power obtained from the grid from the electrolyzer power in terms of time.

In a method for providing instantaneous reserve power for an AC voltage grid by means of a converter which draws electrical AC power from the AC voltage grid and supplies an electrolyzer with electrical DC power, the converter is operated in a voltage-impressing manner, such that a change in the grid frequency in the AC voltage grid causes an immediate change in the AC active power drawn from the AC voltage grid. In this case, an electrolyzer proves to be an advantageous DC load for the voltage-impressing converter since an electrolyzer, on the one hand, can be immediately prompted to change the DC power, for example by virtue of the converter changing the DC voltage at the electrolyzer, and, on the other hand, electrical energy is buffered in the electrolyzer, with the result that the electrolyzer, despite its inherent inertia, tolerates well a brief change in the DC power and therefore well supports brief changes in the AC active power for supporting the grid frequency as part of the instantaneous control.

During normal operation within the scope of the method according to the disclosure, that is to say, in particular, in the case of a grid frequency corresponding to a nominal frequency of the AC voltage grid, the power drawn from the AC voltage grid and supplied to the electrolyzer may be between 50% and 100% of a nominal power of the electrolyzer. In this case, the electrolyzer has a maximum power which is above the nominal power, wherein the nominal power can correspond, in particular, to an operating point which is distinguished by maximum efficiency of the electrolyzer. Owing to the principle involved, the electrolyzer can therefore consume a DC power which is above the nominal power, in particular if the electrolyzer is operated only briefly at this operating point.

In one embodiment of the method, the converter can exchange electrical power with a battery connected on the DC voltage side if a change in the grid frequency causes a change in the AC power and the DC power supplied to the electrolyzer is outside an operating range of the electrolyzer. In this case, the operating range can be limited by a lower onset power of between 10% and 20% of the nominal power and an upper maximum power of between 110% and 120% of the nominal power of the electrolyzer. The battery may be connected to a DC link circuit of the converter in parallel with the electrolyzer via a DC/DC converter.

In a further embodiment of the method, the converter can exchange electrical power with a photovoltaic generator connected on the DC voltage side. During normal operation, that is to say, in particular, in the case of a grid frequency which corresponds to a nominal frequency of the AC voltage grid, the PV generator can be operated at a maximum power point and the electrolyzer can be operated with nominal power. The power of the PV generator is reduced if a change in the grid frequency occurs which causes the converter to reduce an AC power currently being fed in or to increase an AC power currently being drawn. However, if a change in the grid frequency occurs which causes the converter to increase an AC power currently being fed in or to reduce an AC power currently being drawn, the DC power of the electrolyzer is reduced. As a result, instantaneous reserve is available at any time in both directions.

BRIEF DESCRIPTION OF THE FIGURES

The disclosure is described and explained further below on the basis of example embodiments illustrated in the figures.

DETAILED DESCRIPTION

Figure 1:
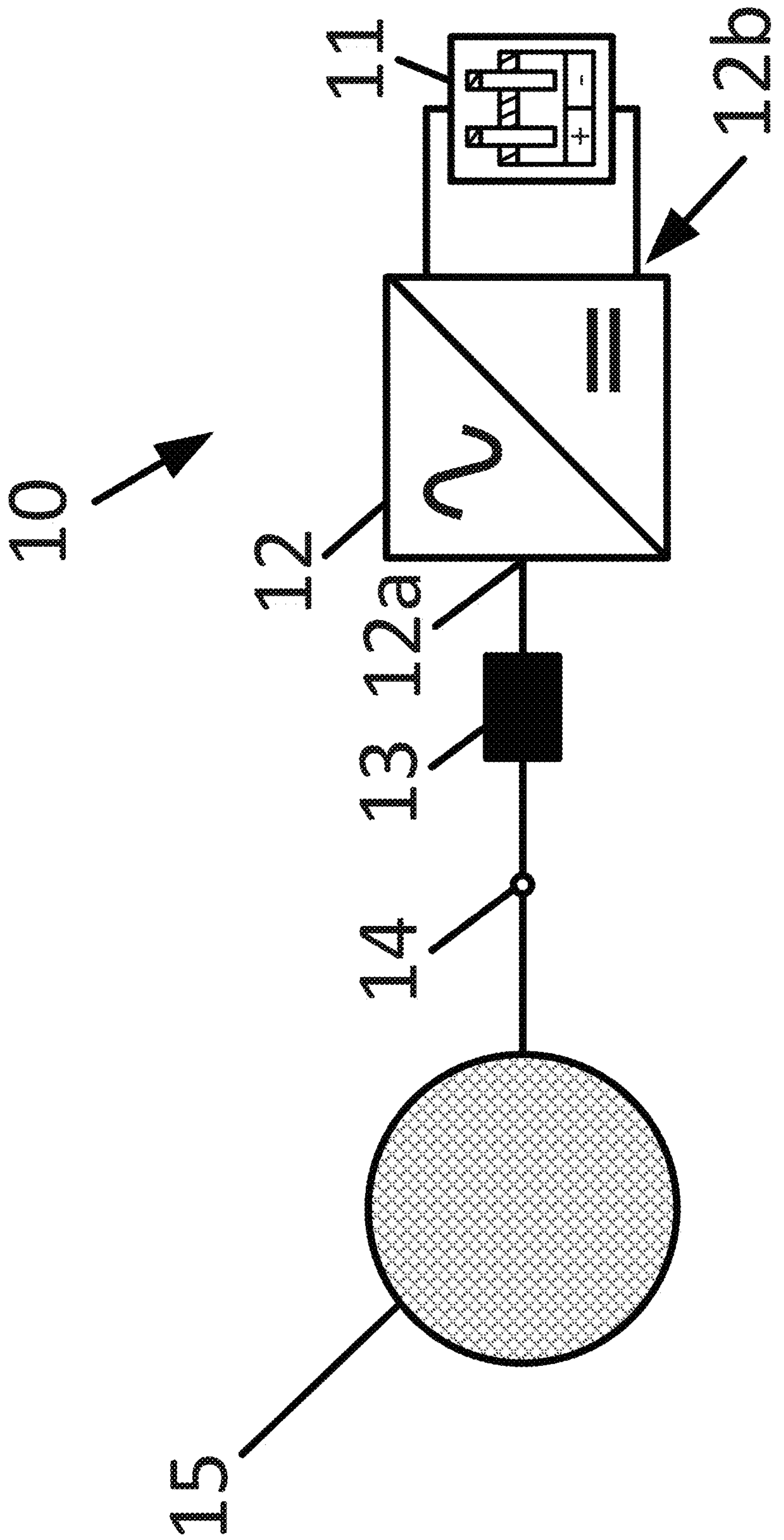
FIG. 1 shows an electrolysis device according to the disclosure having a converter and an electrolyzer.

FIG. 1 shows an electrolysis device 10 having an electrolyzer 11 and a converter 12. The converter 12 is connected to an AC voltage grid 15 via an input 12*a* on the AC voltage side, a decoupling inductance 13, for example, an inductor, and a grid connection point 14 and draws electrical power from the AC voltage grid 15. The electrolyzer 11 is connected to a DC-voltage-side output 12*b* of the converter 12 and is supplied with electrical power by the converter 12.

The converter 12 may have a DC link circuit and, in one embodiment, has a three-phase design, such that the converter 12 can be connected to a three-phase AC voltage grid 15 in order to draw electrical AC power from the AC voltage grid 15 in three phases. The converter 12 may be, in one embodiment, in the form of a self-commutated transistor converter, wherein the transistors of such a converter 12 may be composed of IGBTs and/or MOSFETs.

The electrolyzer 11 essentially constitutes a DC load and is supplied with DC power by the converter 12. The DC power consumed by the electrolyzer 11 depends in this case, via a current/voltage characteristic curve, on the voltage which is applied to the electrolyzer 11 and here corresponds to the voltage at the output 12*b* of the converter 12. Depending on the type and design of the electrolyzer 11, the current/voltage characteristic curve may have different onset voltages and gradients, in which case there is generally a monotonous relationship between the current and the voltage in a permissible input voltage range of the electrolyzer 11, with the result that the DC power consumed by the electrolyzer 11 is higher, the higher the applied voltage.

The electrolyzer 11 has a nominal power at which the electrolyzer 11 can be operated with optimum efficiency. The nominal power is composed of a nominal voltage in the permissible input voltage range of the electrolyzer 11 and an associated nominal current. In principle, input voltages above the nominal voltage are also permissible and result in a higher power consumption, wherein the overall efficiency of the electrolyzer 11 falls above the nominal power, for example on account of the increased power requirement for auxiliary units such as pumps and the like.

The converter 12 supplies the electrolyzer 11 with a DC power which can be adjusted by the converter 12 on the basis of the change in the current grid frequency of the AC voltage grid 15, in particular by adjusting the voltage at the output 12*b* of the converter 12 and therefore the input voltage of the electrolyzer 11 by means of the converter 12 on the basis of the change in the current grid frequency of the AC voltage grid 15.

If the current grid frequency corresponds to the nominal frequency and is constant, the converter 12 is operated in such a manner that the electrolyzer 11 is supplied with a DC power which is equal to or less than the nominal power of the electrolyzer 11. In the case of a constant grid frequency, the DC power can, for example, be set to a value of between 50% and 100% of the nominal power of the electrolyzer.

The converter 12 has semiconductor switches which are not illustrated in any more detail, are arranged in a bridge circuit and are controlled by a control unit (not illustrated) in such a manner that a flow of electrical power from the AC voltage grid 15 to the electrolyzer 11 via the converter 12 is established. In this case, an AC voltage at the grid-side input 12*a* of the converter 12 can be controlled by means of suitable clocking of the semiconductor switches in such a manner that a phase difference between the grid voltage in the AC voltage grid 15 and the AC voltage at the input 12*a* of the converter 12 is formed across the decoupling inductance 13.

Such control can be used to set a desired electrical AC active power by predefining a setpoint for the phase difference. The desired electrical AC active power results from a setpoint of the electrical DC power to be output by the converter 12 on the DC voltage side and to be supplied to the electrolyzer. This DC current setpoint is transformed in the control unit of the converter 12 into the corresponding setpoint for the phase difference between the grid voltage and the input-side AC voltage at the converter 12, such that the setpoint for the phase angle is a function of the desired DC load current. In this case, the electrical AC active power which is drawn from the AC voltage grid 15 by the converter 12 is approximately proportional to the phase difference which is established if the phase difference is small with respect to TT.

On the other hand, the phase difference between the grid voltage and the AC voltage at the input 12*a* of the converter 12 is controlled to the setpoint by the converter 12 itself, wherein the actually flowing AC active power depends on which phase difference is actually present. As a result, a change in the grid frequency, which inevitably causes a change in the phase difference, immediately results in a largely proportional change in the electrical AC active power drawn from the AC voltage grid 15.

A frequency change in the AC voltage grid 15 therefore correlates with a change in the phase angle, with the result that the AC active power which is drawn likewise immediately changes in the event of a change in the grid frequency. In this respect, the converter 12 behaves in a voltage-impressing manner by virtue of the AC active power drawn from the AC voltage grid 15 being immediately reduced if the frequency falls and being immediately increased if the frequency increases.

Figure 2:
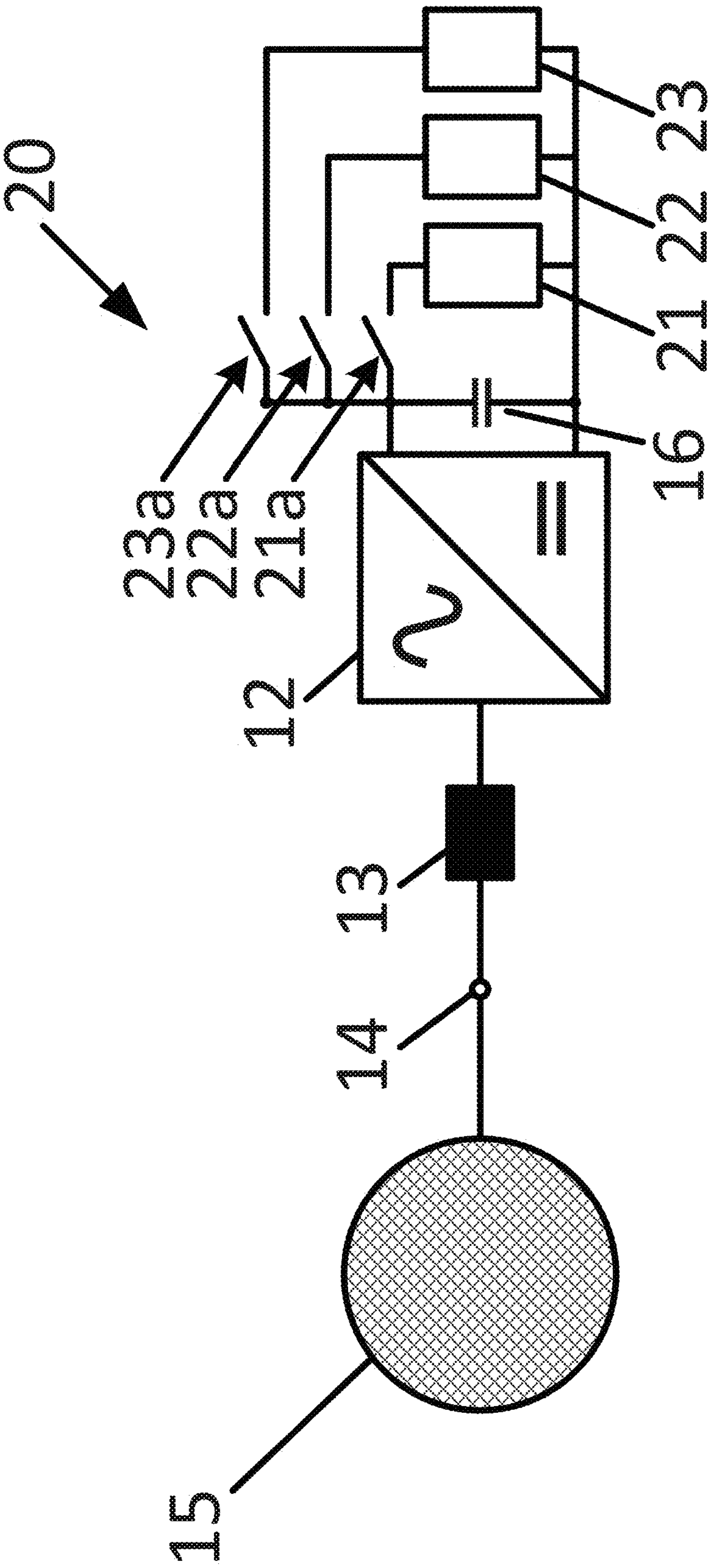
FIG. 2 shows a device having a converter and a plurality of DC loads.

FIG. 2 shows a device 20 having a plurality of DC loads 21, 22, 23 and a converter 12. The converter 12 is connected to an AC voltage grid 15 on the input side via a grid connection point 14 and draws electrical power from the AC voltage grid 15. The DC loads 21, 22, 23 are connected to the DC link circuit 16 via one of the switches 21*a*, 22*a*, 23*a* in each case and are supplied with electrical power by the converter 12. Both electrolyzers 11 and resistive loads, in particular heating resistors or other resistors which are used, for example, for surface finishing or metal processing, can be used here as DC loads 21, 22, 23.

The DC loads 21, 22, 23 can each be connected to the converter 12 or disconnected from the converter 12 via the switches 21*a*, 22*a*, 23*a*. As a result, the DC power flowing overall can be adapted for a given voltage at the DC link circuit 16 of the converter 12 by supplying electrical power to only a portion of the DC loads 21, 22, 23, wherein the portion of the loads 21, 22, 23 to be specifically supplied is selected by suitably controlling the switches 21*a*, 22*a*, 23*a*.

Figure 3:
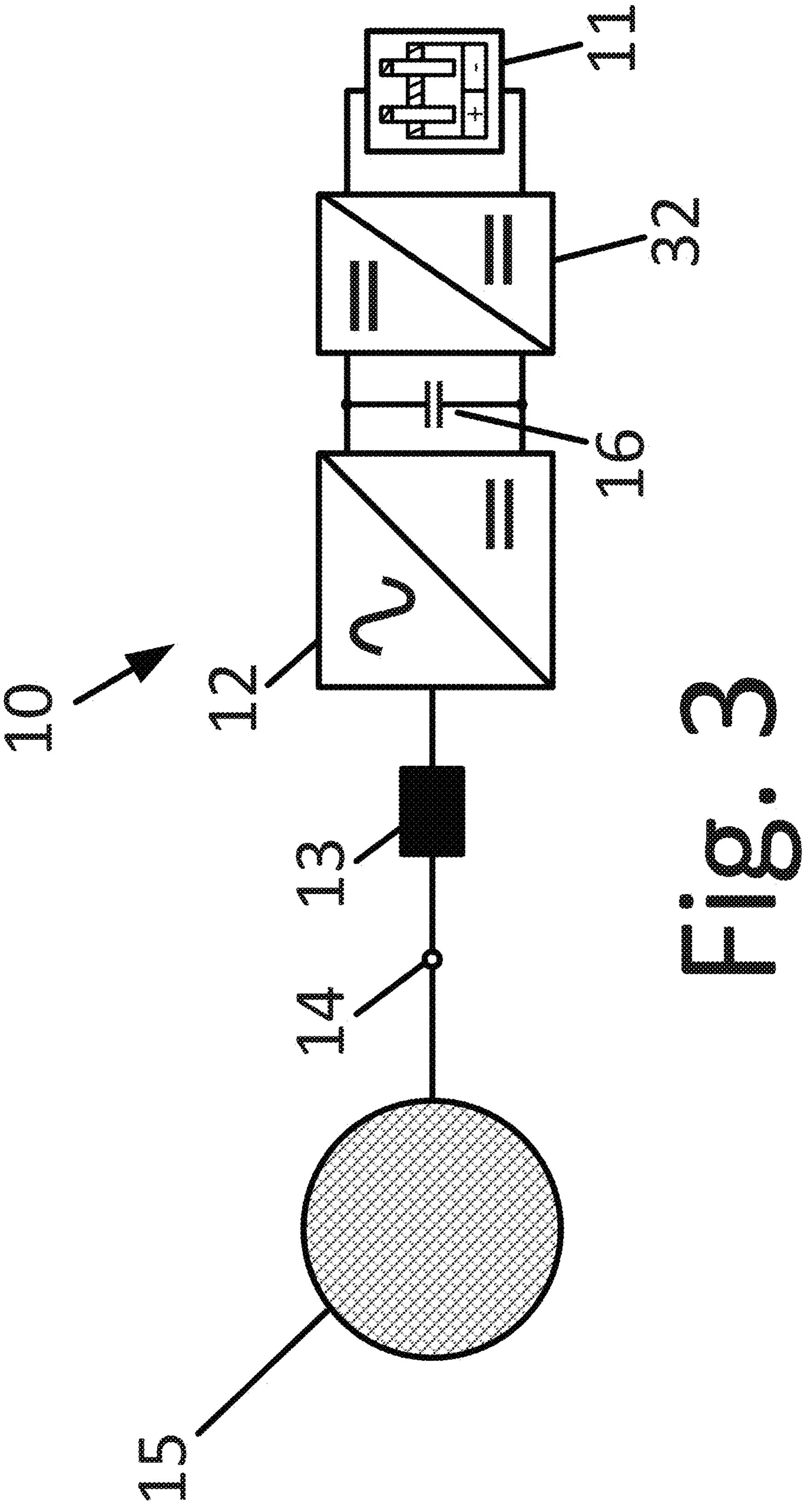
FIG. 3 shows a further electrolysis device having a converter, a DC/DC converter and an electrolyzer.

FIG. 3 shows an electrolysis device 10 having an electrolyzer 11 and a converter 12 according to FIG. 1, wherein a DC/DC converter 32 is additionally arranged between the electrolyzer 11 and the converter 12 and enables a voltage transformation between the voltage at the DC-voltage-side output 12*b* of the converter 12 or at the DC link circuit 16 and the voltage at the electrolyzer 11. The DC/DC converter 32 may be in the form of a boost converter, a buck converter or a boost/buck converter and/or may be configured for a bidirectional power flow, for example.

Such DC/DC converters 32 are known to a person skilled in the art in various embodiments which predominantly comprise clocked semiconductor switches for setting the voltage transformation. In particular, the DC/DC converter 32 may be in the form of a buck converter for a unidirectional power flow from the converter 12 to the electrolyzer 11, which converts the voltage of the DC link circuit 16 into a relatively lower voltage at the electrolyzer 11, wherein the transformation ratio can be set by means of a duty factor, for example.

Figure 4:
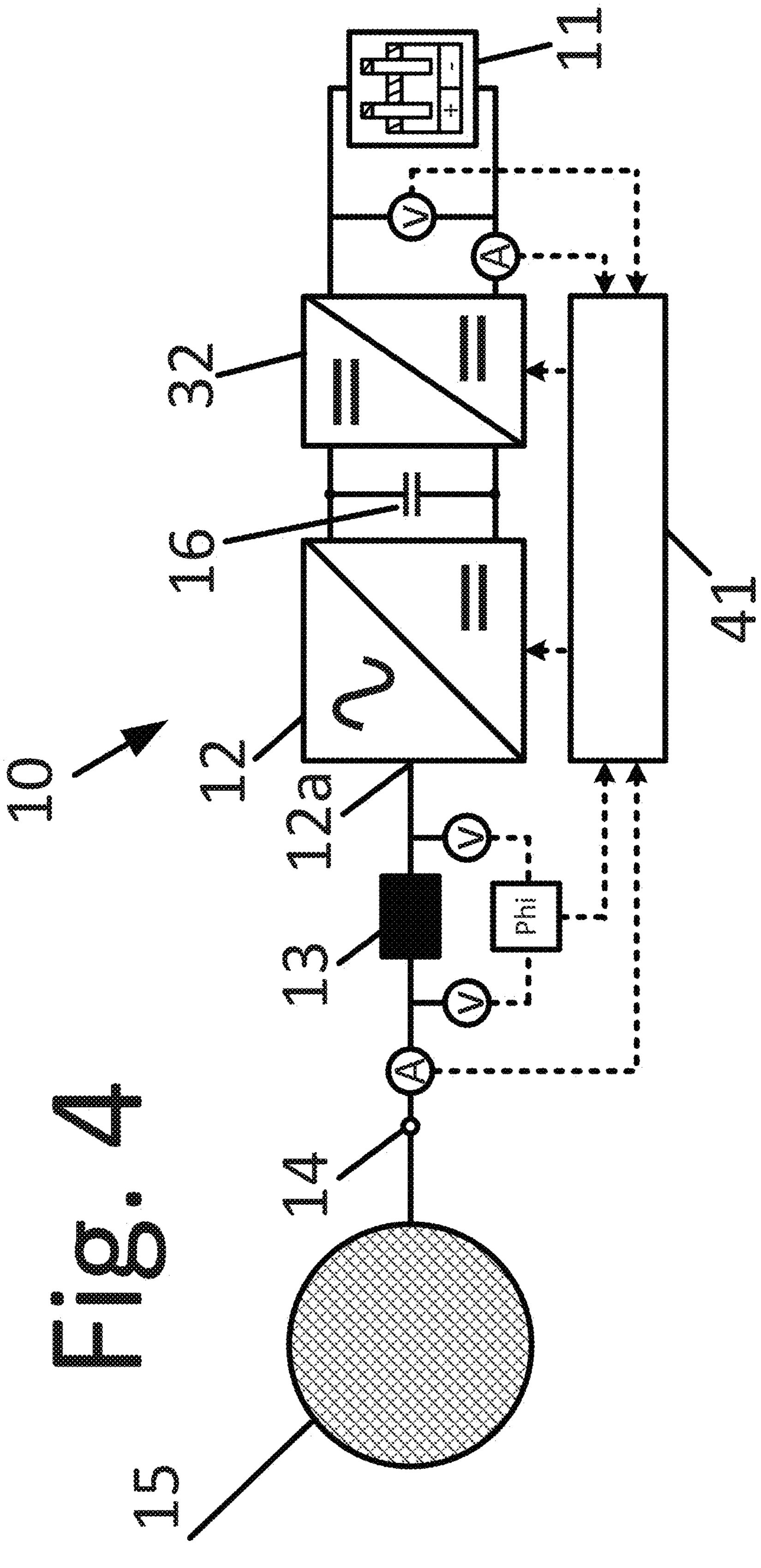
FIG. 4 shows an electrolysis device according to FIG. 3 with a control device.

FIG. 4 shows details of a control system of the converter 12. A control device or circuit 41 generates control signals for the converter 12 and for the DC/DC converter 32, which control signals predefine, in particular, the control of the semiconductor switches of the converter 12 and of the DC/DC converter 32. The control signals may be predefined by the control device 41 on the basis of a setpoint for an electrical DC power, wherein an actual value of the DC power can be determined, for example, on the basis of a current and voltage measurement which may be arranged, in particular, between the DC/DC converter 32 and the electrolyzer 11. The control device 41 determines a suitable duty factor, with which the DC/DC converter 32 must be operated in order to set a suitable voltage at the electrolyzer 11, with the result that the electrolyzer 11 consumes the desired DC power. Since the voltage of the DC link circuit 16 is at least as high as the rectified grid voltage of the AC voltage grid 15, the DC/DC converter 32 makes it possible to apply a considerably lower voltage than the rectified grid voltage to the electrolyzer 11, in contrast to the embodiment according to FIG. 1.

Assuming a given duty factor, the voltages on the two sides of the DC/DC converter 32 are proportional to one another. Therefore, a change in the voltage of the DC link circuit 16 results in a proportional change in the voltage at the electrolyzer 11 provided that the duty factor is not adjusted. Conventional control systems are able to adjust the duty factor with a certain delay, in which case various superordinate control aims can be pursued. In particular, the voltage at the electrolyzer 11 and therefore the DC power can be kept constant. Alternatively, the voltage of the DC link circuit 16 can be kept constant.

As explained in connection with FIG. 1, the converter 12 can operate in a voltage-impressing manner by immediately reducing the AC active power which is drawn from the AC voltage grid 15, in particular on the basis of the phase angle between the grid voltage and the AC voltage at the input 12*a* of the converter 12, in the event of a frequency reduction and immediately increasing the AC active power in the event of a frequency increase. Such an immediate change in the AC active power results in a corresponding change in the voltage of the DC link circuit 16 provided that the DC power remains unchanged. However, even a constant DC power does not suffice to counteract a change in the voltage of the DC link circuit 16 on account of a frequency-related change in the AC active power. Therefore, the DC power must be adapted to the AC power, in which case adjustment of the setpoint for the DC power on the basis of the voltage of the DC link circuit 16 for the purpose of stabilizing precisely this voltage constitutes an indirect and accordingly delayed response.

The control device 41 therefore determines the instantaneous phase difference between the grid voltage in the AC voltage grid 15 and the AC voltage at the input 12*a* of the converter 12 from time-resolved measurements of the voltages upstream and downstream of the decoupling inductance 13. This phase difference can be used in the control device 41 for feedforward control of the setpoint of the DC/DC converter 32. As a result, the setpoint for the DC power, and therefore the duty factor of the DC/DC converter 32, is already adapted in response to a change in the phase difference. This adaptation already takes place before a significant change in the voltage of the DC link circuit 16, which is associated with a change in the AC active power, in particular if the AC active power is changed on account of the voltage-impressing control of the converter 12 in response to a change in the phase difference. This considerably increases the dynamic response of the entire control section.

Figure 5:
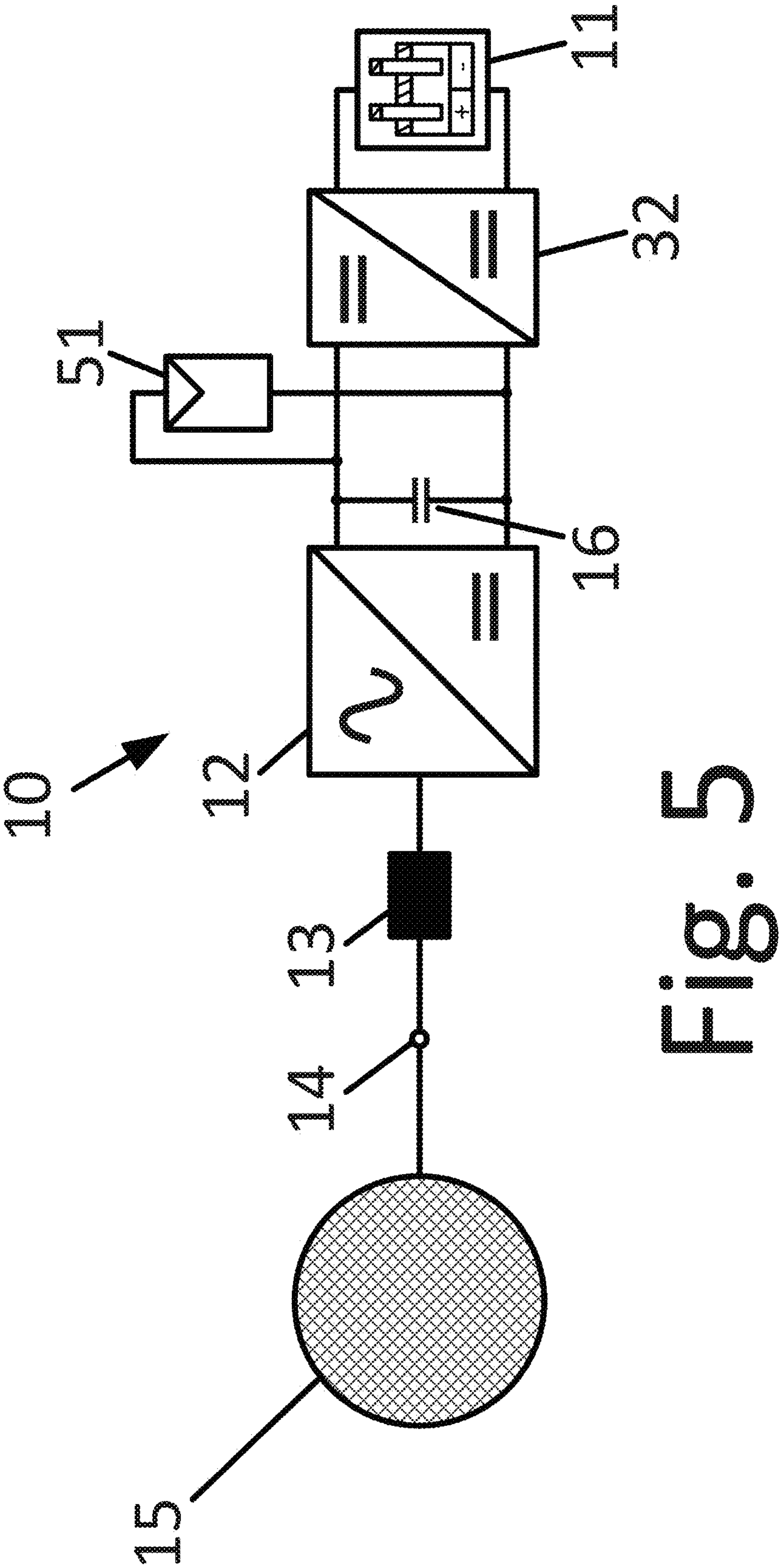
FIG. 5 shows an electrolysis device according to FIG. 3 or 4 with a PV generator.

FIG. 5 shows an electrolysis device 10 having a PV generator 51 which is connected to the DC link circuit 16 of the converter 12 in parallel with the electrolyzer 11. The electrical power of the PV generator 51 can be adjusted via the voltage of the DC link circuit 16 and can be either fed into the electrolyzer 11 or exchanged with the AC voltage grid 15 via the converter 12. In this case, the operating point of the PV generator 51 is set on the basis of the voltage at the DC link circuit 16, whereas the voltage at the electrolyzer 11 can be set independently via the DC/DC converter 32.

Figure 6:
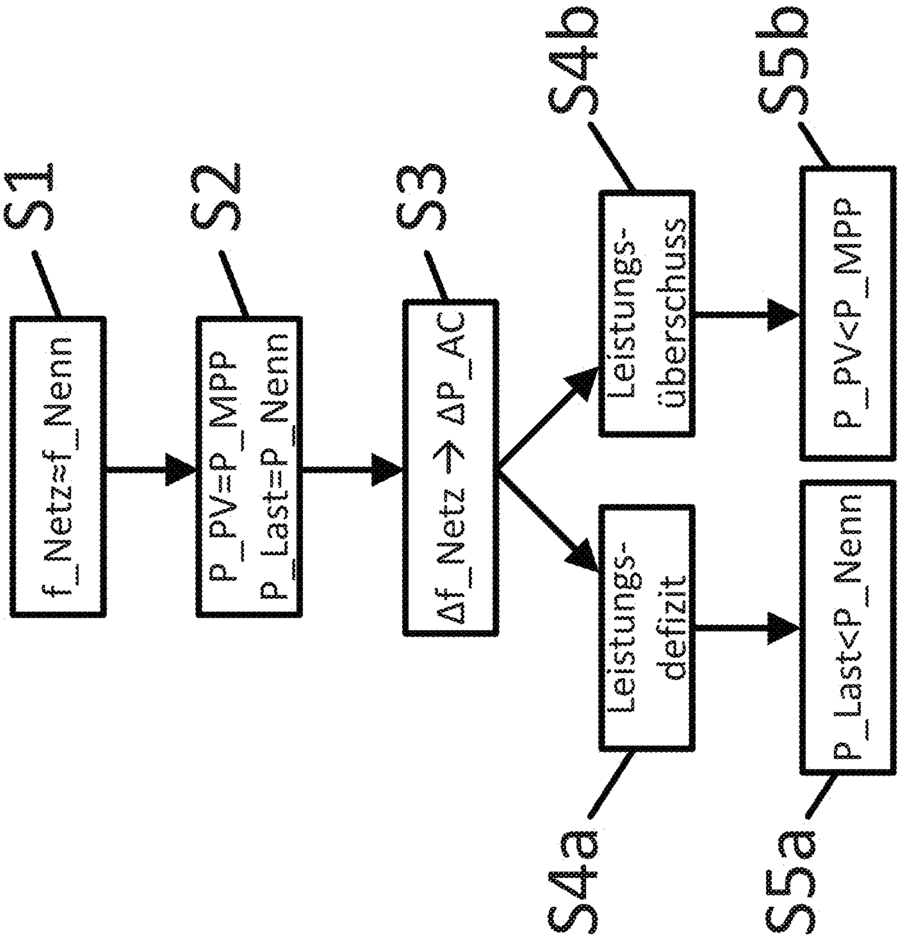
FIG. 6 shows a method for operating a device according to FIG. 3, 4 or 5.

FIG. 6 schematically shows an example sequence of a method for providing balancing power by means of an electrolysis device 10 according to FIG. 5. During normal operation of the electrolysis device 10, for example in the case of a balanced power balance in the AC voltage grid 15 at a grid frequency which corresponds to the nominal frequency of the AC voltage grid 15 and is largely constant (act S1 in FIG. 5), the PV generator 51 can be operated at a maximum possible power point P_MPP and the electrolyzer can be operated with its nominal power P_Nenn (act S2).

In the event of a change in the grid frequency, the converter 12 of the electrolysis device 10 responds with a change in the AC active power (act S3). After S3, depending on the sign of the power imbalance which results in a change in the grid frequency, the method branches to acts S4*a* and S5*a* in the event of a power deficit in the AC voltage grid 15 and to steps S4*b* and S5*b* in the event of a power excess in the AC voltage grid 15.

At S5*a*, the change in the AC power counteracting the power deficit in the AC voltage grid 15 is implemented in the electrolysis device 10 by reducing the DC power P_Last of the electrolyzer 11 in comparison with the nominal power P_Nenn. The PV power P_PV of the PV generator 51 can remain unchanged at P_MPP.

At S5*b*, the change in the AC power counteracting the power excess in the AC voltage grid 15 in the electrolysis device 10 has the opposite sign and could be implemented by increasing the DC power P_Last of the electrolyzer 11 in comparison with the nominal power P_Nenn. However, this proves to be disadvantageous, in particular, when the maximum power is only slightly above the nominal power of the electrolyzer 11 and/or the efficiency of the electrolyzer 11 falls considerably at DC powers above its nominal power. Therefore, additionally or alternatively at S5*b*, the PV power P_PV is reduced in comparison with the maximum possible power P_MPP. This is moreover possible at any time, in particular even at night, when the maximum possible power P_MPP is equal to zero, by feeding DC power back into the PV generator 51.

Figure 9:
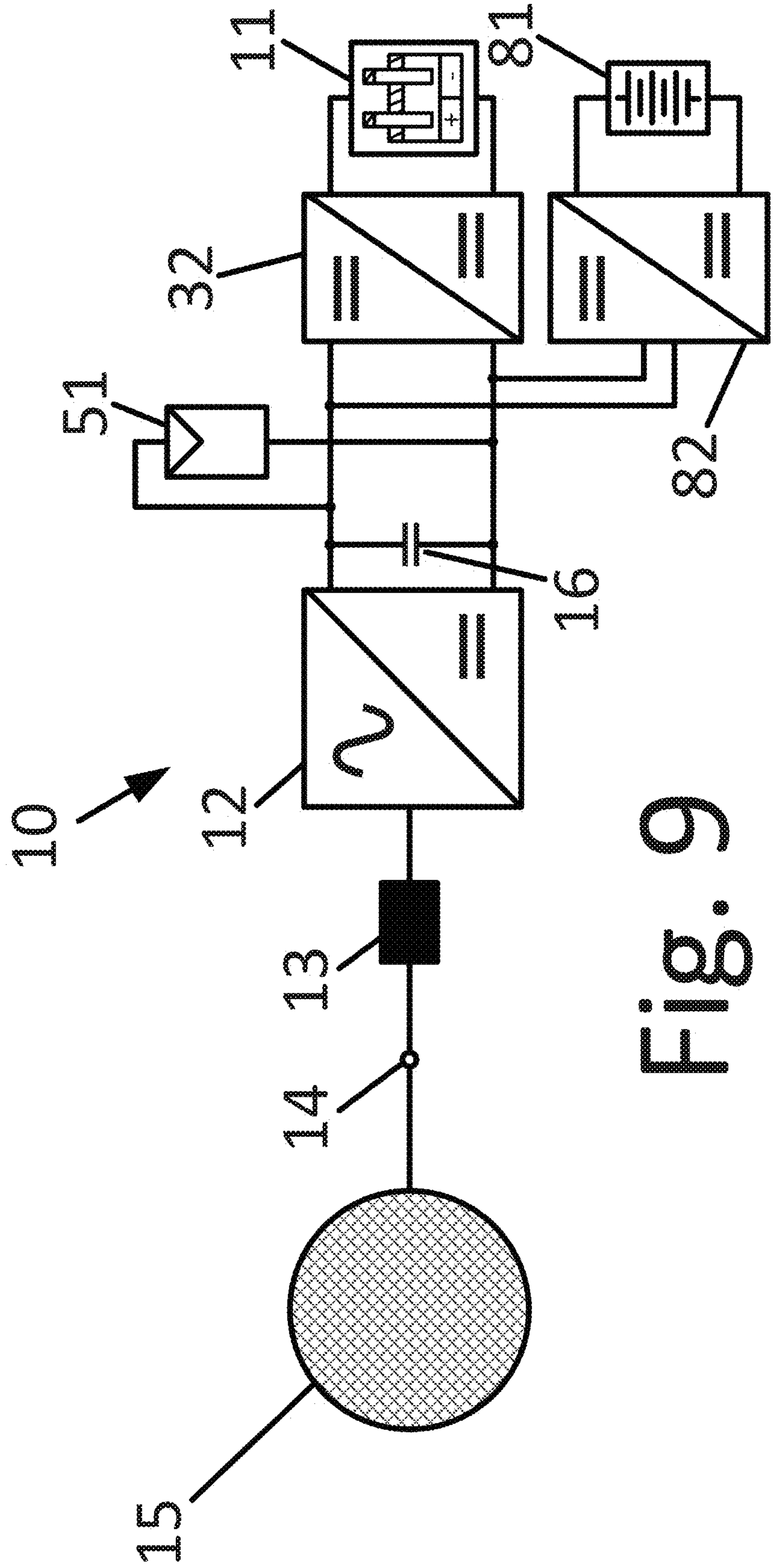
FIG. 9 shows an electrolysis device according to FIG. 8 having a further DC/DC converter and a PV generator.

The DC powers P_Last and P_PV can be adjusted separately from one another, in particular, in an electrolysis device 10 according to FIG. 5 or FIG. 9. The PV power P_PV is adjusted via the voltage at the DC link circuit 16, whereas the DC power P_Last of the electrolyzer 11 results from the voltage at the DC link circuit 16 and the adjustable transformation ratio of the DC/DC converter 32. By operating the electrolysis device 10 using the method according to FIG. 6, it is therefore possible to provide instantaneous reserve power for stabilizing the AC voltage grid 15, in which case balancing power for eliminating a power deficit by reducing the DC power of the electrolyzer 11 and balancing power for eliminating a power excess by restricting the PV generator 51 are achieved.

Figure 7:
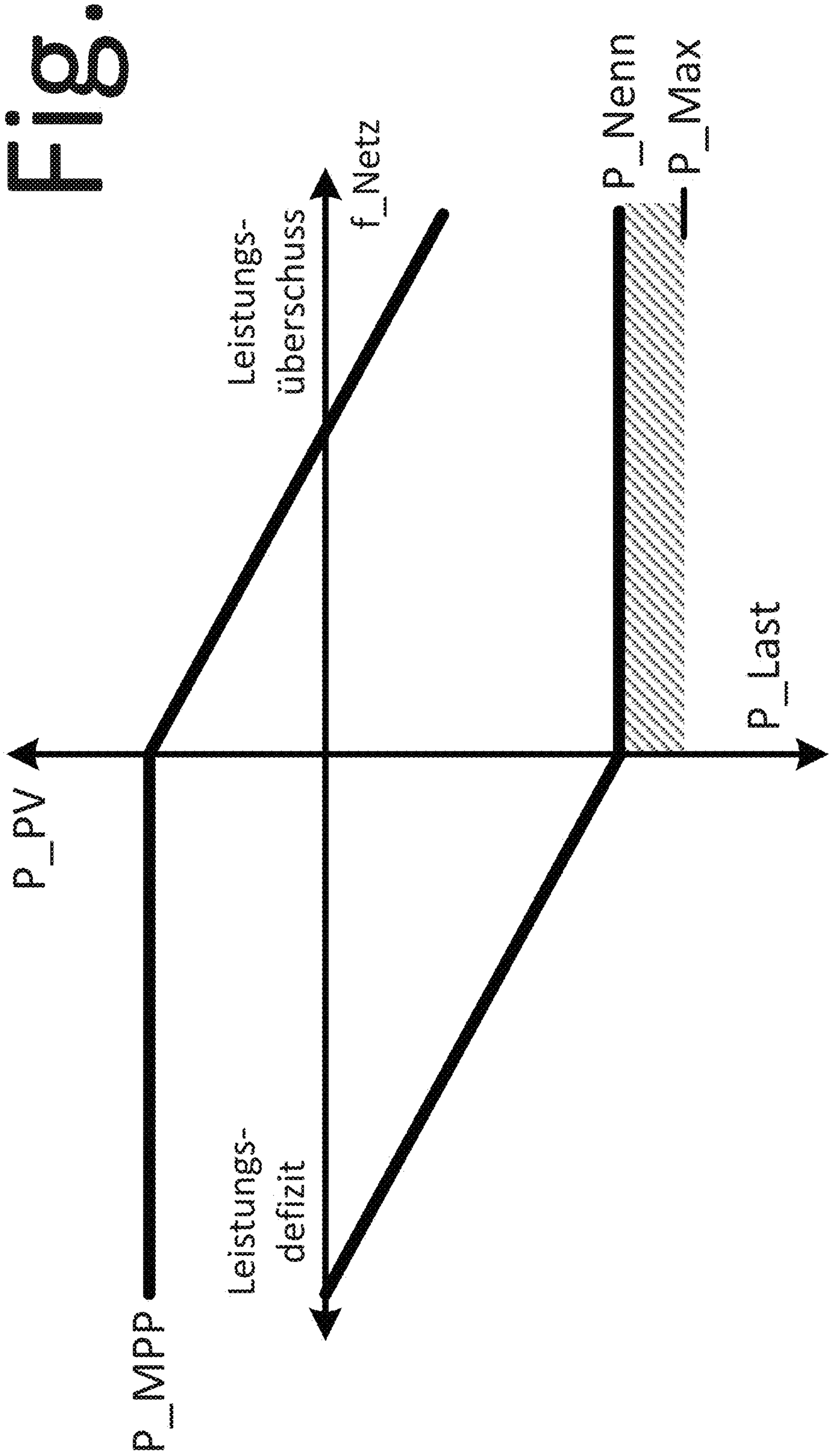
FIG. 7 schematically shows the electrical powers in a device which is operated using a method according to FIG. 6.

FIG. 7 schematically shows an example division of the provision of the balancing power on the basis of the power balance in the AC voltage grid 15.

In the case of a balanced power balance, which can be expressed, in particular, by the fact that the grid frequency is constant and corresponds, in particular, to the nominal frequency of the AC voltage grid 15, the PV generator 51 is operated with maximum possible power P_MPP and the electrolyzer 11 is operated with nominal power P_Nenn. The nominal power P_Nenn of the electrolyzer 11 is a device property and can therefore be assumed to be largely constant. A current sum of the powers P_PV and P_Last, and therefore also the AC power exchanged with the AC voltage grid 15 via the converter 12, therefore depends substantially on the current solar radiation on the PV generator 51. During normal operation, depending on environmental conditions, the AC power can therefore be between the nominal power P_Nenn of the electrolyzer 11 (for example at night, without solar radiation) and the difference between the nominal power P_Nenn of the electrolyzer 11 and a nominal power of the PV generator 51. In a possible special case in which the nominal powers of the electrolyzer 11 and of the PV generator 51 are identical, the AC power during normal operation is therefore between P_Nenn and zero.

In the event of a power deficit in the AC voltage grid 15, the DC power P_Last supplied to the electrolyzer 11 is reduced, whereas the PV power P_PV can still correspond to the maximum possible PV power P_MPP. A rate of change of the grid frequency can be used, in particular, as a measure of the power deficit, such that the power change is proportional to the rate of change of the grid frequency, for example; this may similarly apply to a power excess.

In the event of a power excess in the AC voltage grid 15, the electrolyzer 11 is still operated with its nominal power P_Nenn. In principle, the electrolyzer 11 could also be operated with a power greater than P_Nenn, but generally only with reduced efficiency and/or only briefly. In order to counteract the power excess in the AC voltage grid 15, the power P_PV drawn from the PV generator 51 is therefore additionally or alternatively reduced. In this case, the PV power P_PV may become equal to zero and may become negative, that is to say DC power may be fed back into the PV generator 51 and consumed there. Since the maximum possible PV power P_MPP can be occasionally very low, as described, for example at night, the PV power P_PV can also be reduced solely by increasing the power fed into the PV generator 51 on the basis of the power excess in the AC voltage grid 15.

In a special configuration, the nominal power P_Nenn of the electrolyzer 11 may correspond approximately to the nominal power P_Peak of the PV generator 51. In this case, the complete nominal power P_Nenn of the electrolyzer 11 is available for responding to a power deficit in the AC voltage grid 15, whereas at least the complete nominal power P_Peak of the PV generator 51 is available at any time, in particular even at night, for responding to a power excess in the AC voltage grid 15. Overall, an optimum symmetrical balancing power band with positive and negative balancing power of an identical order of magnitude is therefore provided by an electrolysis device 10 configured in this manner.

In principle, many further configurations of the electrolysis device 10 are conceivable, for example intermediate variants with an electrolyzer 11 as a main component, which is operated at approximately 50% of the nominal power P_Nenn during normal operation, and with a PV generator 51 with a relatively low nominal power P_PV<P_Nenn. In this case, the PV generator 51 carries out part of the power change in response to a power excess in the AC voltage grid 15. The greater the nominal power P_Peak of the PV generator, the higher the desired power P_Last of the electrolyzer 11 during normal operation can also be selected to be.

Another intermediate variant comprises an electrolysis device 10 having a PV generator 51 as a main component, which is operated with maximum possible power P_MPP during normal operation, and having an electrolyzer 11 with a relatively low nominal power P_Nenn<P_Peak. In this case, the electrolyzer 11 carries out the power change in response to a power deficit in the AC voltage grid 15, with the result that it is possible to offer a symmetrical balancing power band which is composed of the nominal power P_Nenn of the electrolyzer 11, on the one hand, and, if necessary, equal restriction of the PV generator 51, on the other hand, and therefore only depends on the nominal power P_Nenn or makes this fully usable for the instantaneous reserve.

Figure 8:
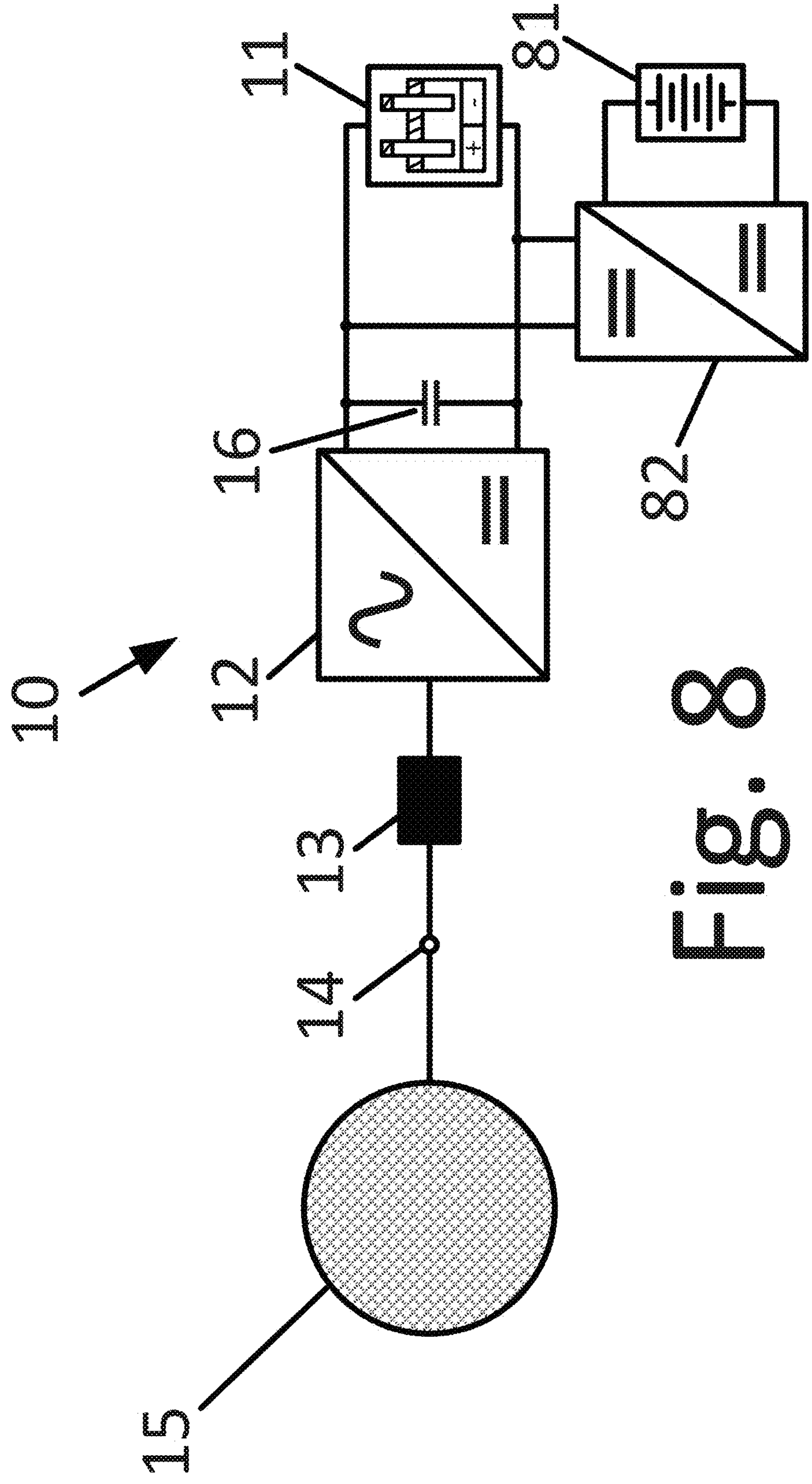
FIG. 8 shows a further electrolysis device having a converter, an electrolyzer, a DC/DC converter and an energy store.

FIG. 8 shows a further embodiment of an electrolysis device 10 having a converter 12 and an electrolyzer 11. In comparison with FIG. 1, the electrolysis device 10 according to FIG. 8 additionally comprises a battery 81 which is connected to the DC link circuit 16 of the converter 12 in parallel with the electrolyzer 11 via a DC/DC converter 82. The DC/DC converter 82 can control, in particular, the exchange of power between the DC link circuit 16 and the battery 81 in such a manner that the voltage at the DC link circuit 16 is stabilized, in which case feedforward control similar to FIG. 4 can be used, if appropriate. In addition, as a result of the battery 81, there is a further degree of freedom available for the specific configuration of the electrolysis device 10 according to FIG. 8 in order to add exclusivity to individual contributions to providing a symmetrical balancing power band as instantaneous reserve. For example, a power change in response to a power deficit in the AC voltage grid 15 can be implemented completely by reducing the DC power P_Last of the electrolyzer 11 to a value below its nominal power P_Nenn, whereas a power change in response to a power excess in the AC voltage grid 15 is implemented completely by feeding DC power into the battery 81; the energy thereby stored in the battery can in turn be used to operate the electrolyzer 11.

FIG. 9 shows a further embodiment of an electrolysis device 10 having a converter 12 and an electrolyzer 11 connected to the converter 12 via a DC/DC converter 32. In comparison with FIG. 3, the electrolysis device 10 according to FIG. 9 additionally comprises a battery 81 which, in a similar manner to FIG. 8, is connected to the DC link circuit 16 of the converter 12 via a further DC/DC converter 82, and a PV generator 51 which, in a similar manner to FIG. 5, is likewise connected to the DC link circuit 16 of the converter 12, possibly via a third DC/DC converter which is not illustrated here. The electrolysis device 10 according to FIG. 9 therefore combines substantially the features of the electrolysis devices 10 according to FIG. 5 and FIG. 8 and therefore also has their advantages.

What is claimed is:

1. A method for operating an electrolysis device having a converter, which is connected, on an AC voltage side, to an AC voltage grid via a decoupling inductance and draws an AC active power from the AC voltage grid, and an electrolyzer, which is connected to the converter on a DC voltage side, comprising:

operating the electrolysis device, when a grid frequency corresponds to a nominal frequency of the AC voltage grid and is substantially constant over a time period, with an electrical power which is between 50% and 100% of a nominal power of the electrolyzer; and providing an instantaneous reserve power to the AC voltage grid wherein the converter emulates a behavior of a synchronous machine with respect to changes in the grid frequency in the AC voltage grid.

2. The method as claimed in claim 1, wherein the converter is operated in a voltage-impressing manner, such that the AC active power drawn from the AC voltage grid is changed on the basis of a change and/or a rate of change of the grid frequency in the AC voltage grid, and/or uses droop mode control which comprises a frequency/power characteristic curve.

3. The method as claimed in claim 1, wherein providing the instantaneous reserve power comprises a change in the AC active power drawn from the AC voltage grid which results in a change in a DC voltage at the electrolyzer, and wherein the change in the DC voltage at the electrolyzer results in a change in a DC power consumed by the electrolyzer, which change corresponds to the change in the AC active power.

4. The method as claimed in claim 1, further comprising producing a voltage transformation between the electrolyzer and the converter using a first DC/DC converter.

5. The method as claimed in claim 4, further comprising:

exchanging electrical power between the converter and a PV generator connected on the DC voltage side, wherein the PV generator is connected to a DC link circuit in parallel with the electrolyzer, and feeding an electrical power generated by the PV generator into the electrolyzer or into the AC voltage grid.

6. The method as claimed in claim 5, further comprising:

stabilizing a voltage of the DC link circuit using the first DC/DC converter; and controlling the first DC/DC converter using feedforward control to set a DC current setpoint of the first DC/DC converter on the basis of a phase difference between a grid voltage and an AC voltage at an input of the converter.

7. The method as claimed in claim 1, further comprising exchanging electrical power between the converter and a battery connected on the DC voltage side, wherein the battery is connected to a DC link circuit in parallel with the electrolyzer via a second DC/DC converter.

8. The method as claimed in claim 7, further comprising:

stabilizing the voltage of the DC link circuit using the second DC/DC converter; and controlling the second DC/DC converter using feedforward control to set a DC current setpoint value of the second DC/DC converter on the basis of a phase difference between a grid voltage and an AC voltage at an input of the converter.

9. An electrolysis device, comprising:

an electrolyzer; and a converter connected to the electrolyzer, wherein the converter is configured to draw electrical AC active power from an AC voltage grid, and wherein the converter is further configured to provide an instantaneous reserve power to the AC voltage grid and/or to emulate a behavior of a synchronous machine with respect to changes in a grid frequency in the AC voltage grid.

10. The electrolysis device as claimed in claim 9, further comprising a first DC/DC converter disposed between the electrolyzer and the converter.

11. The electrolysis device as claimed in claim 9, further comprising a photovoltaic generator connected to a DC link circuit in parallel with the electrolyzer on a DC voltage side of the electrolysis device.

12. The electrolysis device as claimed in claim 9, further comprising a battery connected to a DC link circuit of the electrolysis device in parallel with the electrolyzer via a second DC/DC converter on a DC voltage side of the electrolysis device.

13. The electrolysis device as claimed in claim 9, wherein the converter is further configured to operate in a voltage-impressing manner such that an AC active power drawn from the AC voltage grid is changed on the basis of a change and/or a rate of change of the grid frequency in the AC voltage grid, and/or wherein the converter is further configured to be operated using a droop mode control which comprises a frequency/power characteristic curve.

14. A method for providing instantaneous reserve power for an AC voltage grid by means of a converter which draws electrical AC power from the AC voltage grid and supplies an electrolyzer with electrical DC power, wherein the converter emulates a behavior of a synchronous machine with respect to changes in the grid frequency in the AC voltage grid.

15. The method as claimed in claim 14, wherein the converter is operated in a voltage-impressing manner, such that a change in the grid frequency in the AC voltage grid causes a change in the AC power drawn from the electrical AC voltage grid, and/or uses droop mode control which comprises a frequency/power characteristic curve.

16. The method as claimed in claim 14, wherein, at a grid frequency which corresponds to a nominal frequency of the AC voltage grid, active power drawn from the AC voltage grid and supplied to the electrolyzer is between 50% and 100% of a nominal power of the electrolyzer.

17. The method as claimed in claim 14, wherein the active power drawn from the AC voltage grid depends on the rate of change of the grid frequency, such that an active power returns to an initial value if a rate of change is equal to zero.

18. The method as claimed in claim 14, wherein the converter exchanges electrical power with a battery connected on a DC voltage side thereof if a change in the grid frequency causes a change in the AC power and the electrical DC power supplied to the electrolyzer is at an edge of an operating range of the electrolyzer, wherein the operating range is limited by a lower onset power of between 10% and 20% of a nominal power and an upper maximum power of between 80% and 100% of the nominal power of the electrolyzer, wherein the battery is connected to a DC link circuit of the converter in parallel with the electrolyzer via a DC/DC converter.

19. The method as claimed in claim 14, wherein the converter exchanges electrical power with a photovoltaic (PV) generator connected on a DC voltage side of the converter, wherein, in the case of a grid frequency which corresponds to a nominal frequency of the AC voltage grid, the PV generator is operated at a maximum power point and the electrolyzer is operated with nominal power, wherein the electrical power of the PV generator is reduced if a change in the grid frequency occurs which causes the converter to reduce an AC power currently being fed in or to increase an AC power currently being drawn, and wherein the electrical DC power of the electrolyzer is reduced if a change in the grid frequency occurs which causes the converter to increase an AC power currently being fed in or to reduce an AC power currently being drawn.

* * * * *